United States Patent
Kunichika (10) Patent No.: US 10,354,153 B2
(45) Date of Patent: Jul. 16, 2019

(54) DISPLAY CONTROLLER, DISPLAY CONTROL METHOD, AND RECORDING MEDIUM STORING PROGRAM

(71) Applicant: Yohei Kunichika, Kanagawa (JP)

(72) Inventor: Yohei Kunichika, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/908,928

(22) Filed: Mar. 1, 2018

(65) Prior Publication Data
US 2018/0253611 A1    Sep. 6, 2018

(30) Foreign Application Priority Data

Mar. 2, 2017  (JP) ................................. 2017-039123
Feb. 28, 2018 (JP) ................................. 2018-034335

(51) Int. Cl.
*G06K 9/00* (2006.01)
*B60K 35/00* (2006.01)
(Continued)

(52) U.S. Cl.
CPC .......... *G06K 9/00805* (2013.01); *B60K 35/00* (2013.01); *B60R 1/00* (2013.01);
(Continued)

(58) Field of Classification Search
None
See application file for complete search history.

(56) References Cited

U.S. PATENT DOCUMENTS

2015/0116197 A1* 4/2015 Hamelink ............... G06F 3/013
                                                      345/156
2015/0175068 A1* 6/2015 Szostak .................. B60K 35/00
                                                      340/435
(Continued)

FOREIGN PATENT DOCUMENTS

JP    2003-291688 A    10/2003
JP    2011-193324       9/2011
(Continued)

OTHER PUBLICATIONS

Extended European Search Report dated Jul. 10, 2018 issued in corresponding European Application No. 18159476.3.

*Primary Examiner* — Kyle Zhai
(74) *Attorney, Agent, or Firm* — Harness, Dickey & Pierce, P.L.C.

(57) ABSTRACT

A display controller, a display control method, and a recording medium storing a program. The display controller and the display control method include receiving foreground data used to recognize an object existing ahead of a vehicle in a direction of travel, receiving line-of-vision data from which line of vision of a driver of the vehicle is obtained, recognizing a prescribed object in the foreground data, determining whether the recognized prescribed object meets prescribed conditions, determining a range of central vision and a range of peripheral vision in the foreground data, using the line-of-vision data, determining in which one of the range of central vision and the range of peripheral vision the prescribed object that is determined to meet the prescribed conditions exists, and controlling a display of a notification for the prescribed object differently according to a result of the determining. The recording medium executes the above display control method.

18 Claims, 9 Drawing Sheets

(51) Int. Cl.
  *B60R 1/00* (2006.01)
  *G02B 27/01* (2006.01)
  *G06T 11/00* (2006.01)
  *G08G 1/16* (2006.01)

(52) U.S. Cl.
  CPC .......... *G02B 27/0101* (2013.01); *G06T 11/00* (2013.01); *G08G 1/166* (2013.01); *B60K 2350/2052* (2013.01); *B60K 2350/962* (2013.01); *B60K 2350/965* (2013.01); *B60R 2300/205* (2013.01); *B60R 2300/301* (2013.01); *B60R 2300/305* (2013.01); *B60R 2300/308* (2013.01); *B60R 2300/605* (2013.01); *B60R 2300/8093* (2013.01); *G02B 2027/0138* (2013.01); *G02B 2027/0141* (2013.01)

(56) References Cited

U.S. PATENT DOCUMENTS

2016/0054795 A1* 2/2016 Sasaki ................. G06F 3/013
                                                     345/642
2016/0082840 A1  3/2016 Yoshida et al.

FOREIGN PATENT DOCUMENTS

| JP | 2012-148710 A | 8/2012 |
| JP | 2012-212351 A | 11/2012 |
| JP | 2013-203103   | 10/2013 |
| JP | 2015-180037   | 10/2015 |

* cited by examiner

✖ POSITION TO WHICH LINE OF VISION IS DIRECTED

FIG. 4

✖ POSITION TO WHICH LINE OF VISION IS DIRECTED
● RANGE OF CENTRAL VISION
■ RANGE OF PERIPHERAL VISION

DISPLAY CONTROLLER, DISPLAY CONTROL METHOD, AND RECORDING MEDIUM STORING PROGRAM

CROSS-REFERENCE TO RELATED APPLICATIONS

This patent application is based on and claims priority pursuant to 35 U.S.C. § 119(a) to Japanese Patent Application Nos. 2017-039123 and 2018-034335, filed on Mar. 2, 2017, and Feb. 28, 2018, respectively, in the Japan Patent Office, the entire disclosures of which are hereby incorporated by reference herein.

BACKGROUND

Technical Field

Embodiments of the present disclosure relate to a display controller, a display control method, and a recording medium storing a program.

Background Art

Currently, heads-up displays that provide a driver with traffic information or dangerous object information by displaying an image on a front windshield are mounted in a car as on-vehicle equipment. As characteristics of human vision, a central vision and a peripheral vision are known in the art. The central vision has high spatial resolution, and is advantageous for object recognition. The peripheral vision is advantageous in supplementing the movement or position of an object. In view of such characteristics of vision, mechanisms to recognize what the object is without directing the line of vision to an object existing in the peripheral vision (i.e., a mechanism in which the detailed information on an object existing in the peripheral vision is obtained and displayed in the central vision) are known in the art.

For example, a display control program, a display controller, and a display are known where the driver of a vehicle can recognize the category of an object existing in the peripheral vision without directing the line of vision to that object, for the purpose of increasing the successful rate in object recognition for the driver. The data is displayed on a display unit such as a heads-up display (HUD) in view of the characteristics of peripheral vision.

SUMMARY

Embodiments of the present disclosure described herein provide a display controller, a display control method, and a recording medium storing a program. The display controller and the display control method include receiving foreground data used to recognize an object existing ahead of a vehicle in a direction of travel, receiving line-of-vision data from which line of vision of a driver of the vehicle is obtained, recognizing a prescribed object in the foreground data, determining whether the recognized prescribed object meets prescribed conditions, determining a range of central vision and a range of peripheral vision in the foreground data, using the line-of-vision data, determining in which one of the range of central vision and the range of peripheral vision the prescribed object that is determined to meet the prescribed conditions exists, and controlling a display of a notification for the prescribed object differently according to a result of the determining. The recording medium executes the above display control method.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some embodiments of the present disclosure are described below with reference to the drawings. Note that like reference signs denote like elements among the drawings for purposes of simplification. A display controller according to an embodiment of the present disclosure determines, in the foreground data that is obtained by capturing an image ahead of the vehicle in the directions of travel, the range of central vision and the range of peripheral vision with reference to the line of vision of the driver. Moreover, the display controller generates, for a dangerous object existing in the peripheral vision, a danger notification different from notifications to dangerous objects existing in the central vision (for example, a dynamic notification), and superimposes and displays the generated danger notification on the dangerous object existing in the peripheral vision. Due to this configuration, the driver can be aware of the dangerous object at an earlier stage. The foreground data is used to recognize (detect) an object existing ahead of the vehicle in the directions of travel, and includes, for example, the image data that is obtained by capturing an image ahead of the vehicle in the directions of travel, and the data of the object detected by a detection device such as a radar and a sensor. In the following description, an embodiment of the present disclosure is described in detail with reference to the drawings.

<First Embodiment>

In the first embodiment, cases in which the foreground image that is obtained by capturing an image ahead of the vehicle in the directions of travel is used as image data are described.

Figure 10:
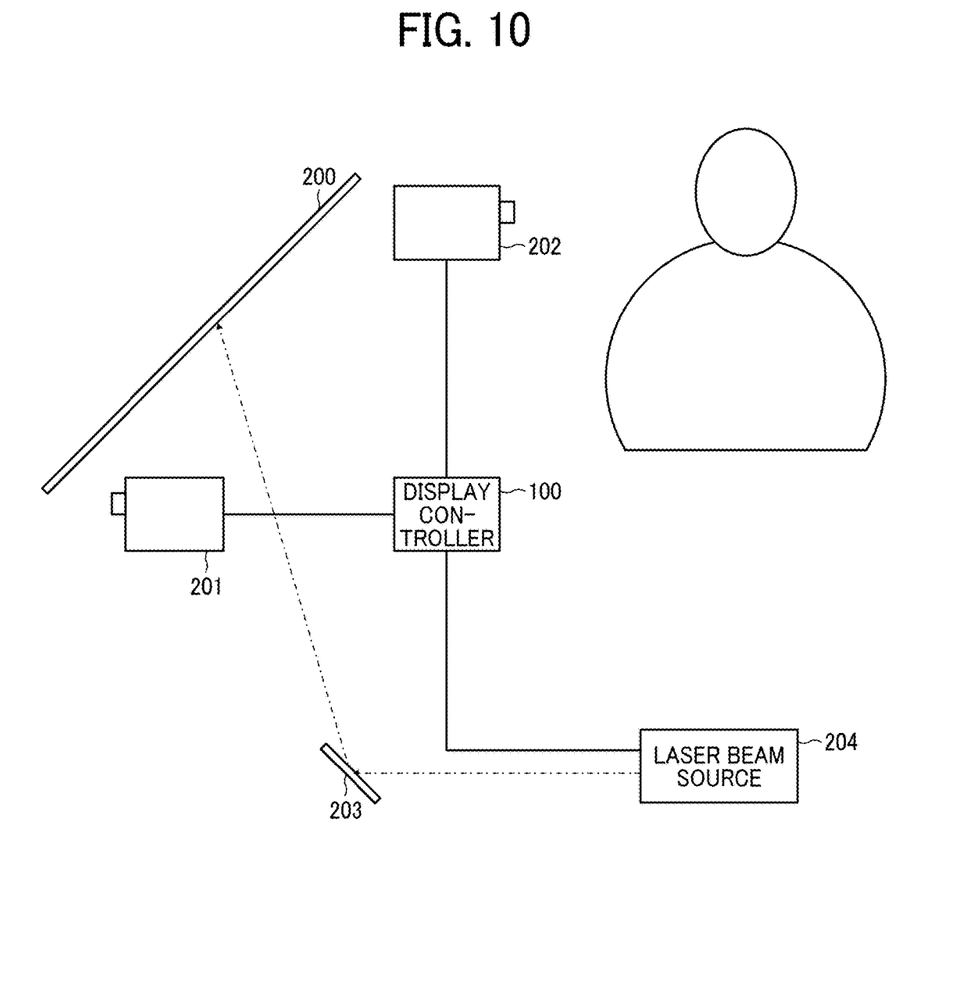
FIG. 10 is a schematic diagram illustrating a configuration of an entire system, according to an embodiment of the present disclosure.

FIG. 10 is a schematic diagram illustrating a configuration of an entire system, according to the present embodiment.

The system includes a display controller 100, a front camera 201, a line-of-vision camera 202, an optical system including a mirror 203, and a laser beam source 204. The laser beam source 204 internally includes a plurality of light emitting elements, and those light emitting elements are display devices in which the timing of light emission or the light-emission intensity is controlled by the display controller 100. The front camera 201 captures an image of the sight ahead of the vehicle through a front windshield 200 of the vehicle. The line-of-vision camera 202 captures an image of an area around the eyes of the driver. The mirror 203 reflects the laser beams that are emitted from the laser beam source, and irradiates the front windshield 200 with the reflected laser beams. In one embodiment, the system of FIG. 10 is configured as a heads-up display (HUD), which may be implemented by a panel system or a laser scanning system. In the panel system, an intermediate image is formed by an imaging device such as a liquid crystal panel, a digital micromirror device (DMD) panel (digital mirror device panel), or a vacuum fluorescent display (VFD). In the laser scanning system, an intermediate image is formed by scanning a laser beam emitted from a laser beam source, using a two-dimensional scanning device.

More specifically, in this example, that light that corresponds to the image data generated by the display controller 100, output from the laser beam source 204, is directed to the optical system including the mirror 203. In one example, the optical system includes a screen that forms an intermediate image thereon with the light from the laser beam source 204. The light is then reflected by the mirror 203 toward the front windshield 200. Accordingly, the driver can visually recognize a virtual image, which is a magnified intermediate image, through the windshield 200.

Figure 1:
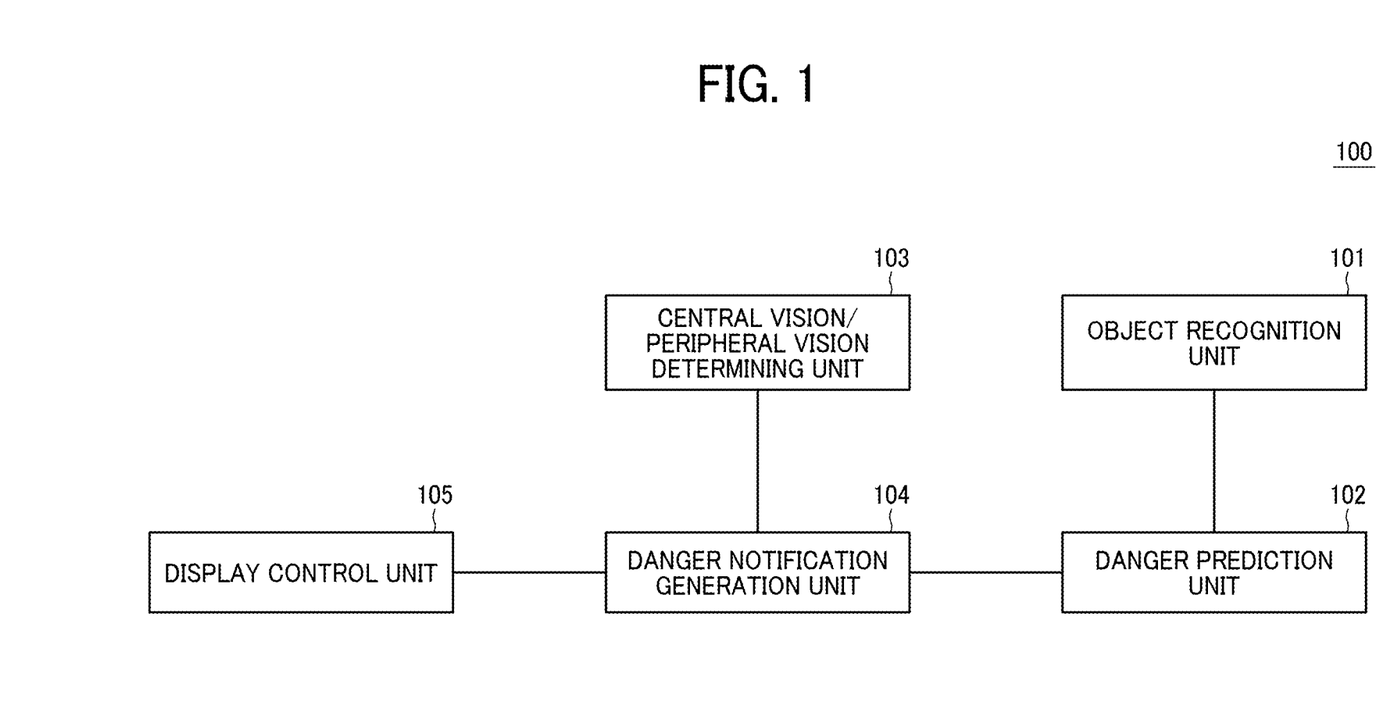
FIG. 1 is a diagram illustrating a functional configuration of a display controller, according to an embodiment of the present disclosure.

FIG. 1 is a diagram illustrating a functional configuration of a display controller 100, according to a first embodiment of the present disclosure.

The display controller 100 includes an object recognition unit 101, a danger prediction unit 102, a central vision/peripheral vision determining unit 103, a danger notification generation unit 104, and a display control unit 105. The display controller 100 is configured to receive a foreground image and line-of-vision data from which the line of vision of the driver can be obtained. For example, from the image of at least the eyes of the driver, the line-of-vision of the driver can be detected.

The object recognition unit 101 receives the foreground image that is obtained by capturing an image ahead of the vehicle in the directions of travel with the front camera 201, and recognizes a prescribed object in the foreground image. The data of such a prescribed object (hereinafter, such data of a prescribed object may be referred to as "object data" where appropriate) is specified in advance, and is stored in a storage area of the display controller 100 or any storage area to which the object recognition unit 101 is accessible. Moreover, the object recognition unit 101 specifies the position or relative velocity of the recognized object. The danger prediction unit 102 predicts whether the object recognized by the object recognition unit 101 is dangerous based on the data where dangerous objects are specified in advance. The term "prediction" in the present disclosure indicates determining whether or not prescribed conditions are met based on the data where dangerous objects are specified in advance. The data where dangerous objects are specified in advance (hereinafter, such data may be referred to as "dangerous object definition data" where appropriate) is stored in a storage area within the display controller 100 or any storage area to which the danger prediction unit 102 is accessible. The data where dangerous objects are specified may include, for example, the data (e.g., threshold) used to determine whether or not the recognized object is dangerous based on the position of the recognized object (i.e., the distance to the vehicle) or the relative velocity of the recognized object. Moreover, the data where dangerous objects are specified may include data to change the priority level depending on the type of object (for example, a higher priority is given to a person over any vehicle).

The central vision/peripheral vision determining unit 103 receives the line-of-vision data and the foreground image, and determines the range of central vision and the range of peripheral vision in the foreground image with reference to the line of vision of the driver. The danger notification generation unit 104 generates a danger notification depending on whether the object that is determined to be dangerous by the danger prediction unit 102 is in which of the range of central vision and the range of peripheral vision that are determined by the central vision/peripheral vision determining unit 103. The display control unit 105 controls the laser beam source such that the danger notification generated by the danger notification generation unit 104 is displayed.

Figure 2:
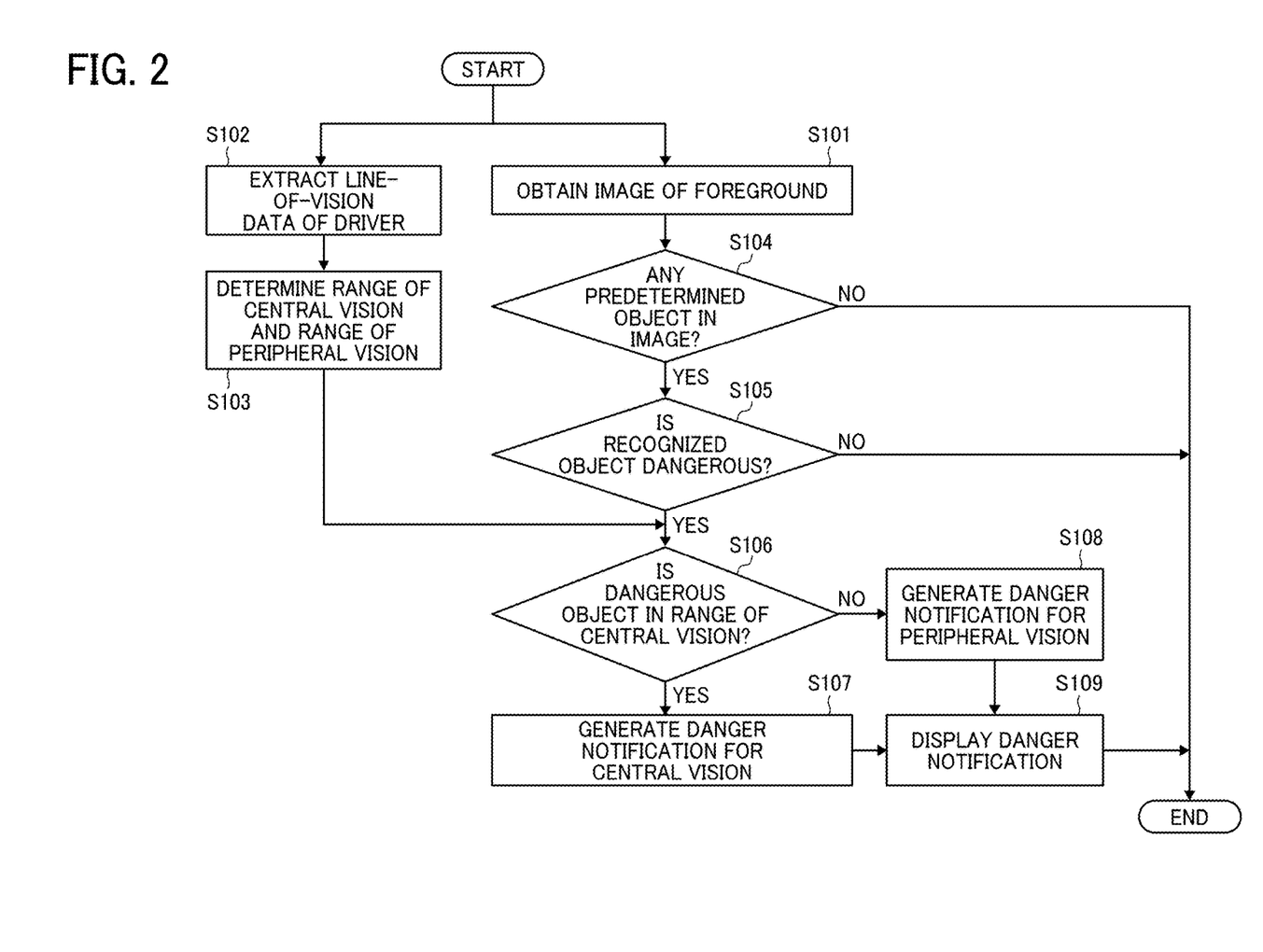
FIG. 2 is a flowchart of the processes of displaying a danger notification for one foreground image, according to an embodiment of the present disclosure.

FIG. 2 is a flowchart of the processes of displaying a danger notification for one foreground image, according to the present embodiment.

The display controller 100 scans the foreground image captured by the front camera 201 (step S101). On the other hand, the display controller 100 extracts the line-of-vision data of the driver from the image captured by the line-of-vision camera 202 (step S102). More specifically, in response to reception of the scanned foreground image from the front camera 201, the object recognition unit 101 starts operation to perform the step S101. In a similar manner, in response to reception of the extracted line-of-vision data from the line-of-vision camera 202, the central vision/peripheral vision determining unit 103 starts operation to perform the step S102.

The central vision/peripheral vision determining unit 103 specifies to what point of the foreground image obtained in the step S101 the line of vision of the driver is directed to based on the line-of-vision data of the driver obtained in the step S102, and determines the range of central vision and the range of peripheral vision in the foreground image. Then, the central vision/peripheral vision determining unit 103 outputs the result of determining processes to the danger notification generation unit 104 (step S103). The object recognition unit 101 refers to the object data, and recognizes the existence or nonexistence of any one of the objects that are specified in advance in the foreground image obtained in the step S101 (step S104). When such an object exists ("YES" in the step S104), the object recognition unit 101 outputs the data of the recognized object to the danger prediction unit 102.

The danger prediction unit 102 receives the data of the one or more recognized objects from the object recognition unit 101, and predicts whether or not each one of the recognized objects is dangerous referring to the dangerous object definition data (step S105). When at least one of the recognized objects is predicted to be dangerous for the vehicle ("YES" in the step S105), the danger prediction unit 102 outputs the data of such dangerous objects to the danger notification generation unit 104. When a plurality of dangerous objects are predicted by the danger prediction unit 102, the danger notification generation unit 104 repeats the processes in the steps S106 to S108 by the number of predicted dangerous objects. The danger notification generation unit 104 determines whether the dangerous object is in the range of central vision or in the range of peripheral vision based on the range of central vision and the range of peripheral vision in the foreground image (step S106). When the dangerous object is in the range of central vision ("YES" in the step S106), the danger notification generation unit 104 generates a danger notification for the central vision (step S107). When the dangerous object is in the range of peripheral vision ("NO" in the step S106), the danger notification generation unit 104 generates a danger notification for the peripheral vision (step S108). The display control unit 105 controls the laser beam source 204 (step S109) to emit a light to form an image based on the generated danger notification. Accordingly, the generated danger notification will be displayed on a predetermined area (called, display area) of the front windshield 200. The notification that is once output may be unchanged when the field of vision shifts. The display control unit 105 controls the laser beam source 204 to emit light to form an image, such that, when the image is displayed, the danger notification generated in the step S107 or the step S108 will overlap with the actual dangerous object in the foreground (step S109) through the windshield 200, and terminates the processes.

When the object recognition unit 101 does not recognize any one of the objects that are specified in advance in the foreground image ("NO" in the step S104), or when there is no dangerous object at all for the vehicle among the objects predicted by the danger prediction unit 102 ("NO" in the step S105), the display controller 100 terminates the processes at that time.

FIG. 2 depicts the processes for one foreground image.

When a plurality of consecutive foreground images are to be processed, the display controller 100 does not terminate the processes after the processes in the step S109, and returns the processes to the beginning.

In order to handle a plurality of foreground images, when a plurality of foreground images are received, the display controller 100 is configured to generate and display a danger notification upon processing the multiple foreground images and the latest line-of-vision data obtained from the received multiple foreground images. For example, when a plurality of consecutive foreground images are to be processed, the display controller 100 generates a different danger notification for the same dangerous object according to the shift in the line of vision depending on whether the dangerous object is in the range of central vision or in the range of peripheral vision, and displays the generated danger notification. More specifically, the central vision/peripheral vision determining unit 103 uses foreground images and the latest line-of-vision data, and determines the range of central vision or the range of peripheral vision in the foreground image with reference to the line of vision of the driver indicated by the line-of-vision data. It is desired that the display controller 100 be configured to store the previously received line-of-vision data (i.e., the latest line-of-vision data) in a storage area until new line-of-vision data is received. Due to this configuration, when the line of vision is shifted and the ranges of central vision and peripheral vision are changed, a danger notification can be altered and displayed depending on whether the dangerous object is in which of the central vision or the peripheral vision at that time, for the same dangerous object. Accordingly, even if the line of vision is shifted, the driver can make judgment and take an action appropriately in response to the dangerous object. Moreover, even when the position of the dangerous object shifts between the central vision and the peripheral vision due to the movement of a dangerous object or the shift of the line of vision of the driver, a different danger notification is generated depending on such shift. Accordingly, the driver can quickly notice and respond to a dangerous object existing anywhere in the foreground, and can avoid the danger.

Figure 3:
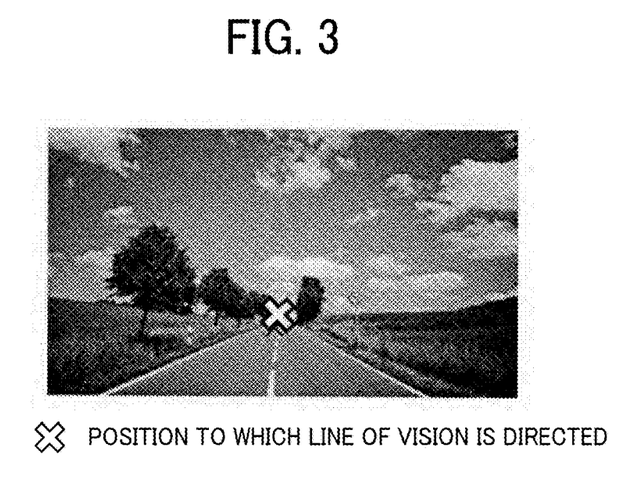
FIG. 3 is an example foreground image and a line of vision indicated thereon, according to an embodiment of the present disclosure.
Figure 4:
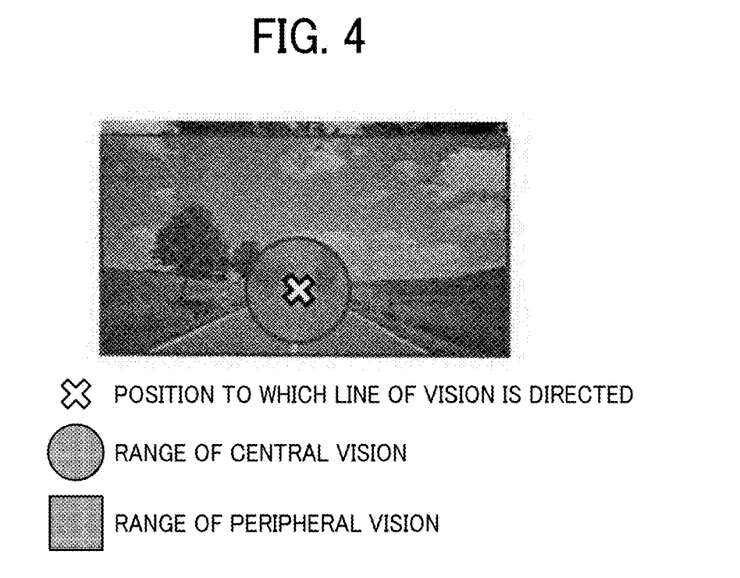
FIG. 4 is an example image on which how the range of central vision and the range of peripheral vision are determined is indicated, according to an embodiment of the present disclosure.

FIG. 3 and FIG. 4 are example images on which how the range of central vision and the range of peripheral vision are determined is indicated, according to the present embodiment.

When the image of FIG. 3 is successfully obtained as the foreground image of the vehicle and the line of vision of the driver is directed to the position at which a sign "x" is set, the range of central vision and the range of peripheral vision are determined as illustrated in FIG. 4. It is commonly known in the art that the central vision has about 20 degrees in the up-and-down directions and the right and left directions with reference to the point to which the line of vision is directed, and it is also known in the art that the peripheral vision has about 130 degrees in the up-and-down directions and has about 180 degrees in the right and left directions. Accordingly, the central vision/peripheral vision determining unit 103 can determine the range if the point to which the line of vision is directed is known. Next, some concrete examples of danger notification are described with reference to FIG. 5 to FIG. 7. In the present embodiment, it is assumed that people and vehicles are defined as dangerous objects in advance in the dangerous object definition data due to this configuration.

Figure 5:
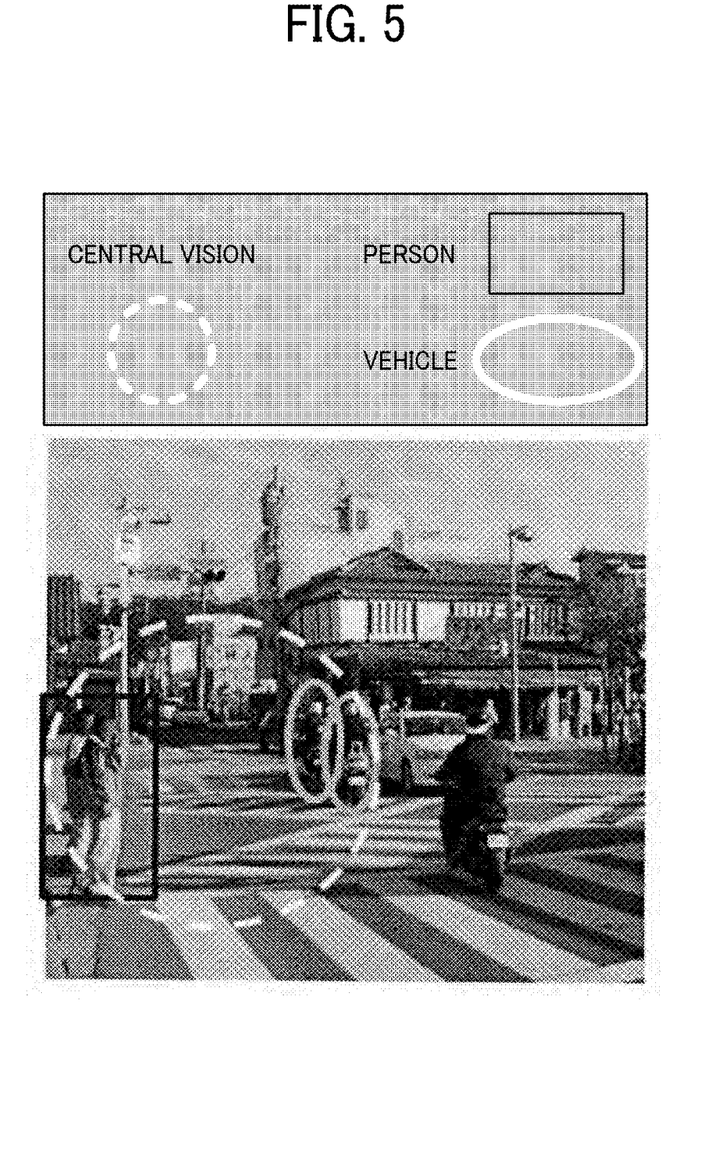
FIG. 5 is an example image on which danger notifications for central vision are indicated, according to an embodiment of the present disclosure.
Figure 6:
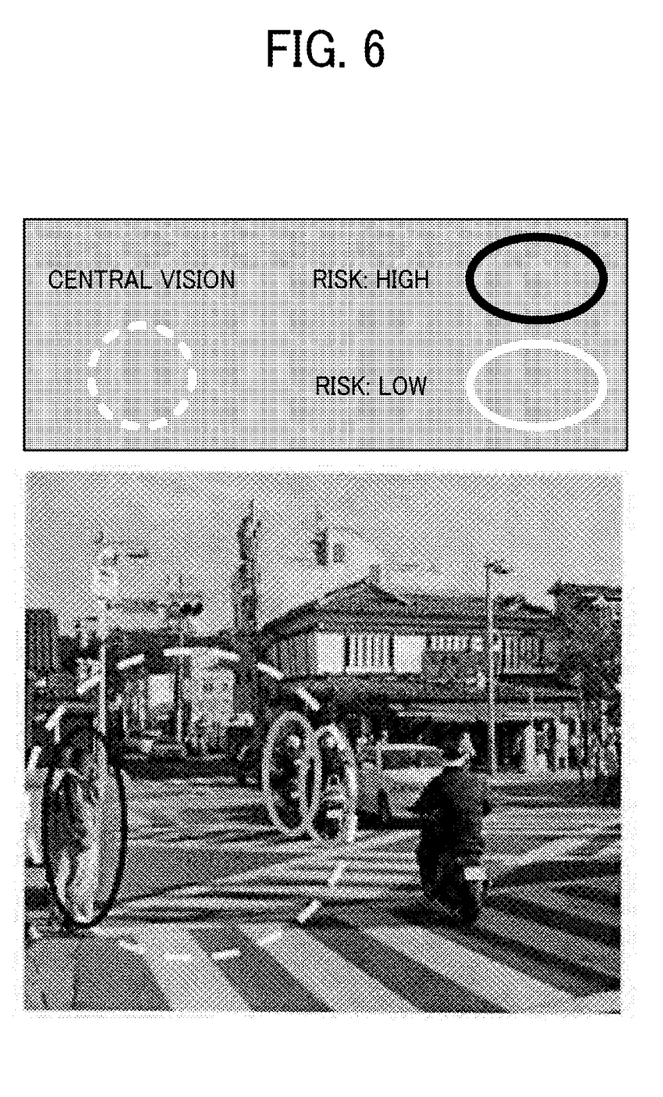
FIG. 6 is another example image on which danger notifications for central vision are indicated, according to an embodiment of the present disclosure.

FIG. 5 and FIG. 6 are diagrams each illustrating a concrete danger notification for the central vision, according to the present embodiment.

FIG. 5 is an example image on which the types of dangerous objects such as a person or a vehicle are indicated, according to the present embodiment. When the inside of a circle with a white broken line indicates the range of central vision, for dangerous objects existing in the central vision (where people and vehicles are targeted), for example, a red rectangle is generated for a person and a yellow circle is generated for a vehicle as danger notifications. In view of the characteristics that the central vision is advantageous for object recognition, the detailed information about dangerous objects are expressed by the shape or color of the danger notifications.

FIG. 6 is an example image on which the types of risk of dangerous objects are indicated, according to the present embodiment.

When the inside of a circle with a white broken line indicates the range of central vision, for example, a high-risk object (i.e., a person in the present embodiment) is surrounded by a "red circle", and a low-risk object is surrounded by a "yellow circle" for the dangerous objects existing in the central vision. By so doing, a danger notification is generated. Alternatively, the danger notification generation unit 104 may generate danger notifications with different shapes or colors depending on the types of dangerous objects and the level of risk. For example, dangerous objects of the same type may be classified into several groups depending on the level of risk. In particular, people who drive or ride a vehicle such as a motorbike or a bicycle may be distinguished from the other people who do not. As illustrated in FIG. 5 and FIG. 6 for example, additional information is displayed for dangerous objects. This configuration helps the driver to make more appropriate judgment.

Figure 7:
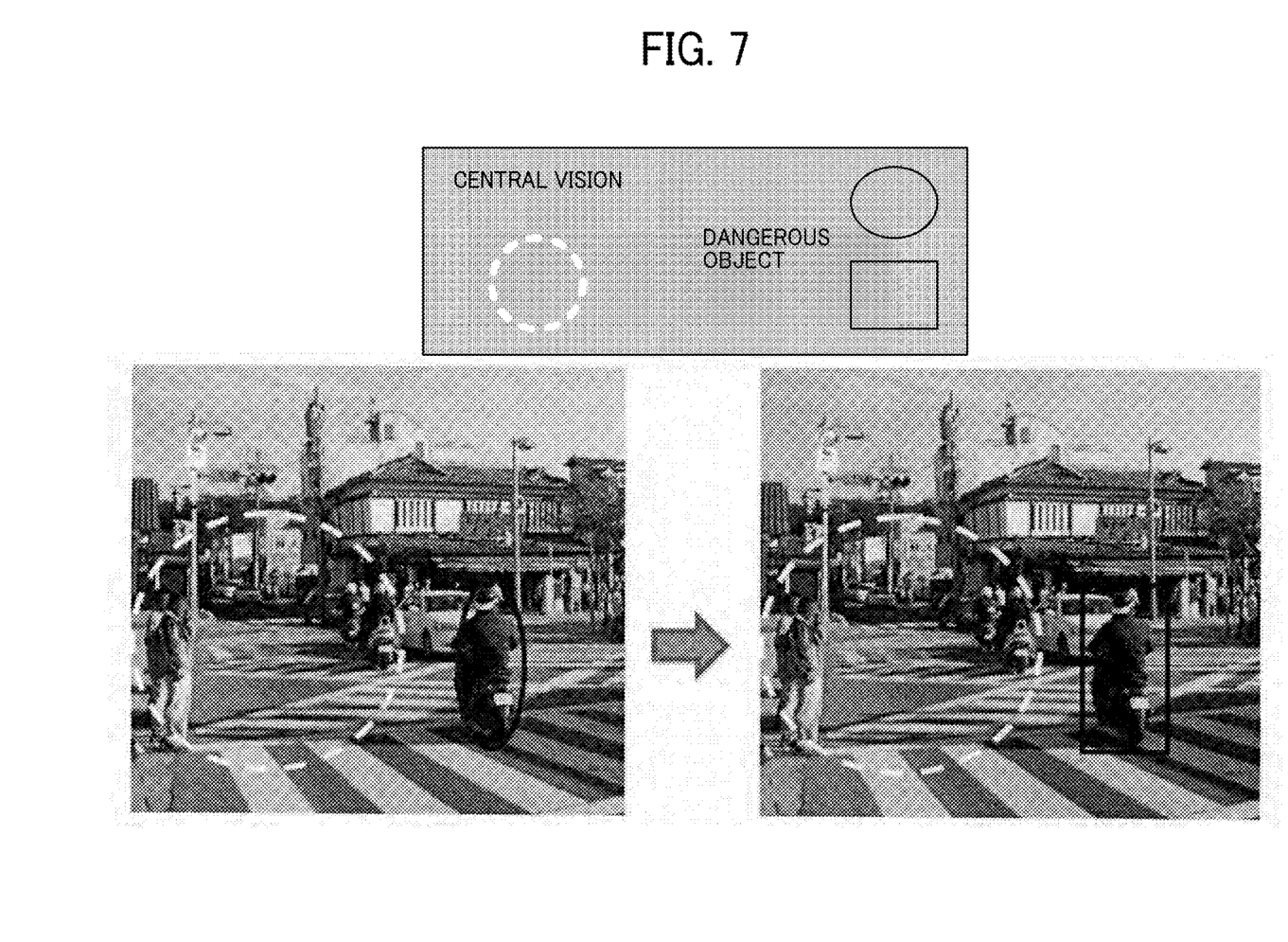
FIG. 7 is a diagram illustrating example images on which danger notifications for peripheral vision are indicated, according to an embodiment of the present disclosure.

FIG. 7 is a diagram illustrating a concrete danger notification for the peripheral vision, according to the present embodiment.

When the inside of a circle with a white broken line indicates the range of central vision, for a dangerous object existing outside the central vision, that is, in the peripheral vision (where people and vehicles are targeted), the shape changes from circular to rectangular as a danger notification. In FIG. 7, a circle is indicated for a person riding on a motorbike on the image on the left, and a rectangle is indicated on the image the right side. In view of the characteristics that the peripheral vision is advantageous in supplementing the movement or position of an object, where the risk is at is expressed by the movement of the danger notification. Alternatively, a danger notification may express the movement, for example, by changes in size or by blinking. Alternatively, as a dynamic danger notification, the danger notification generation unit 104 may generate a danger notification by one of or a combination of two or more of changes in shape, changes in size, blinking, or the like. As illustrated in FIG. 7 for example, a dynamic danger notification is displayed at the position where the dangerous object is in the range of peripheral vision. This configuration helps the driver to avoid danger quickly. When the field of vision of the driver shifts and the danger notification also changes accordingly, the display in the field of vision of the driver frequently changes. Such a configuration may affect the recognition of the driver. In view of the above circumstances, another method of generating one of a danger notification for the peripheral vision and a danger notification for the central vision, which is to avoid the above situation, is described.

Figure 8:
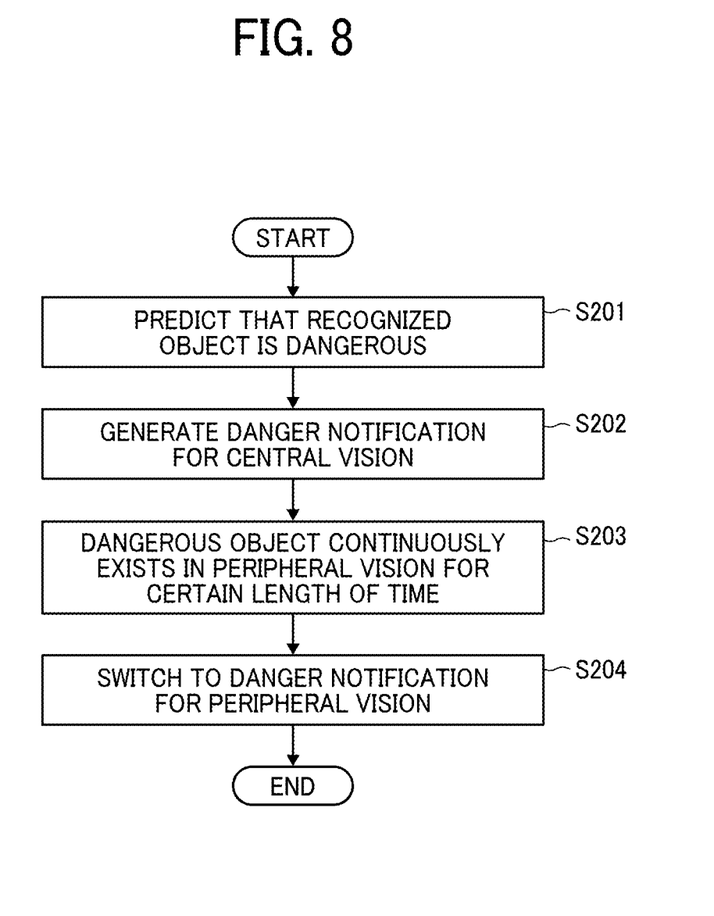
FIG. 8 is a flowchart of another set of processes of displaying a danger notification for one foreground image, according to an embodiment of the present disclosure.

FIG. 8 is a flowchart of another set of processes of displaying a danger notification for one foreground image, according to the present embodiment.

The danger prediction unit 102 receives the data of the recognized object from the object recognition unit 101, and predicts whether or not the recognized object is dangerous referring to the dangerous object definition data (S201). When at least one of the recognized objects is predicted to be dangerous for the vehicle (S201), regardless of whether the recognized dangerous object is placed in any of the peripheral vision or the central vision, the danger prediction unit 102 generates a danger notification for the central vision for the prescribed object in the central vision (step S202). The danger prediction unit 102 does not generate a danger notification for the prescribed object in the peripheral vision. However, when the target dangerous object continuously exists in the peripheral vision for a certain length of time (S203), the danger notification for the target dangerous object is switched from a danger notification for the central vision to a danger notification for the peripheral vision (S204). In this flow of FIG. 8, even when the field of vision of the driver shifts and moves to the range of central vision, when the danger notification for the dangerous object has been switched to a danger notification for the peripheral vision, such a danger notification for the peripheral vision remains unchanged and is not switched to a danger notification for the central vision. Due to this configuration, even when the field of vision of the driver shifts, the switching between the central vision and the peripheral vision does not occur frequently, and the adverse effect on the recognition of the driver, which could be caused by frequent changes between the central vision and the peripheral vision, can be reduced.

Figure 9:
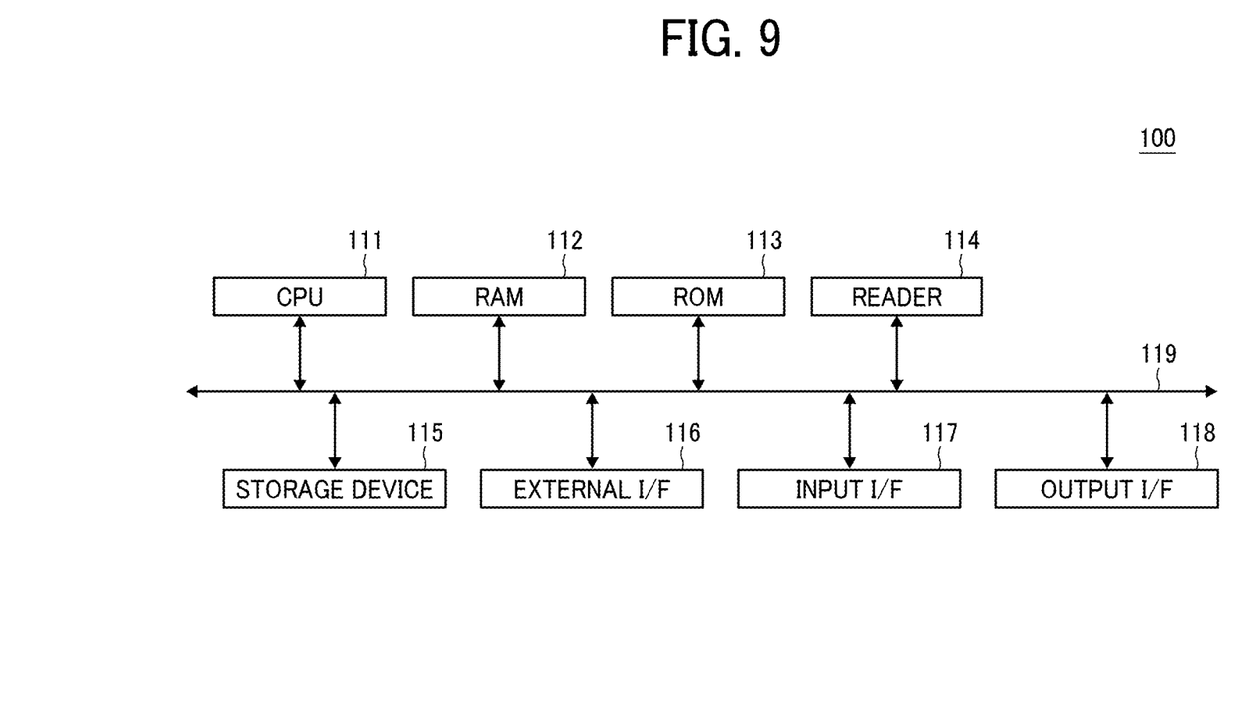
FIG. 9 is a diagram illustrating a hardware configuration of a display controller, according to an embodiment of the present disclosure.

FIG. 9 is a diagram illustrating a hardware configuration of the display controller 100, according to the present embodiment.

The display controller 100 includes a central processing unit (CPU) 111, a random access memory (RAM) 112, a read only memory (ROM) 113, a reader 114, a storage device 115, an external interface (I/F) 116, an input interface (I/F) 117, and an output interface (I/F) 118. Each of the elements is connected to a bus 119.

The CPU 111 executes various kinds of programs to control the entirety of the display controller 100. Moreover, the CPU 111 controls the laser beam source 204 illustrated in FIG. 10 according to a control program. The RAM 112 is a volatile storage medium where the data can be read and written at high speed, and serves as a work area when the CPU 111 executes the program. The ROM 113 is a read-only nonvolatile memory in which various kinds of programs or control programs are stored. The reader 114 is a device to read (receive) the images that are captured by the front camera 201 or the line-of-vision camera 202 as illustrated in FIG. 10. The reader 114 outputs the scanned or extracted image and line-of-vision data to the object recognition unit 101 or to the central vision/peripheral vision determining unit 103. Note also that when the display controller 100 uses the detected data as the foreground data (as will be described later in detail as a second embodiment of the present disclosure), the reader 114 is configured to obtain data from the detection device in place of the front camera 201.

The storage device 115 stores various kinds of programs, input image data, and various kinds of digital data to be processed, and is configured by, for example, a hard disk drive (HDD) and a flash memory. The external interface 116 is an interface (communication interface) that controls the connection to an external device or the transmission and reception of data, and communicates with an external device through the Ethernet (registered trademark) or the universal serial bus (USB). The input interface 117 is an operation unit that accepts instructions for the display controller 100 from a user, and is, for example, a touch panel, input buttons, or input keys. The output interface 118 is, for example, a display interface that outputs various kinds of information for display to a user.

In order to implement the functions of the display controller 100 as described above by executing a program, in the display controller 100 as illustrated in FIG. 9, a program stored in a storage medium (such as the ROM 113 and the storage device 115) is read into the RAM 112, and the CPU 111 executes a set of instructions of the program. Some of or the entirety of the functional blocks of the display controller 100, as illustrated in FIG. 1, may be implemented by hardware. For example, like an embedded system, the functional blocks of the display controller 100 may be implemented by a combination of software and hardware, or alternatively, may be implemented by any one of hardware, firmware, and software, a combination of two or more of these hardware, firmware, and the software.

The display controller 100 may be configured to obtain predetermined object data or dangerous object definition data from an external recording medium or the network, through the external interface 116. Moreover, the display controller 100 may be configured such that a user can modify the predetermined object data or dangerous object definition data through the input interface 117. In the present disclosure, the display device is not limited to a laser beam source as long as the display device has a function of displaying an image on the front windshield 200. For example, the display device may be a transmissive display.

<Second Embodiment>

In the first embodiment, cases in which the foreground images that are captured by, for example, a camera are used as the foreground data are described. By contrast, in the present embodiment, cases in which the detected data is used as the foreground data are described. The detected data is obtained by detecting or capturing data using a radar (for example, a millimeter-wave radar and a laser) that is used to recognize an object, a camera, and a detection device such as an optical sensor. For example, when a radar is used, an object is detected by detecting an electric wave that collides with an object and then is reflected.

When the display controller 100 receives the detected data, the object recognition unit 101 recognizes the presence of an object based on the detected data, and obtains data such as the position of the object and the relative velocity. The central vision/peripheral vision determining unit 103 can obtain the position of the object based on the detected data. Accordingly, the central vision/peripheral vision determining unit 103 can determine whether the object is in which one of the range of central vision and the range of the peripheral vision, using the line-of-vision data. Further, the danger prediction unit 102 can predict whether or not the object is dangerous based on the position of the object obtained from the detected data. The basic operation of the functional blocks of the display controller 100 is similar to that of the first embodiment. In addition to the foreground data as described above, the foreground data is satisfactory as long as the presence of an object is recognizable from such foreground data and the position of the object or the like is obtainable from such foreground data.

In the preferred embodiments of the present disclosure as described above, in view of the characteristics that the peripheral vision is advantageous in supplementing the movement or position of an object, a dynamic danger notification is superimposed and displayed on a dangerous object existing in the peripheral vision. For example, in the display controller 100, danger notifications with different shapes or colors are superimposed and displayed on dangerous objects existing in the central vision, and a dynamic danger notification is superimposed and displayed on a dangerous object existing in the peripheral vision. Due to this configuration, the driver can sense where the danger is in the peripheral vision. Accordingly, the driver can quickly respond to a dangerous object existing in the peripheral vision, and can avoid the danger.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored on any kind of storage medium. Examples of storage media include, but are not limited to, flexible disks, hard disks, optical discs, magnetic recording mediums, magneto-optical discs, magnetic tape, nonvolatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

The hardware platform includes any desired kind of hardware resources including, for example, a CPU, a RAM, and a HDD. The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An apparatus for controlling display, the apparatus comprising circuitry configured to:
   receive foreground data including at least one object that is located ahead of a vehicle in a direction of travel, and line-of-vision data from which a line of vision of a driver of the vehicle is obtained;
   recognize the at least one object in the foreground data;
   determine whether the recognized at least one object meets prescribed conditions;
   determine a range of central vision and a range of peripheral vision in the foreground data using the line-of-vision data;
   determine whether the prescribed object is located in the range of central vision or the range of peripheral vision of the driver;

control a display of a notification corresponding to the prescribed object differently according to a result of the determination of whether the prescribed object is located in the range of central vision or the range of peripheral vision; and wherein in response to the prescribed object being in the range of central vision, the circuitry is configured to generate a notification for display in the central vision for the prescribed object; and in response to the prescribed object being in the range of peripheral vision for a certain length of time or longer, the circuitry is configured to,
 generate a notification for display in the peripheral vision for the prescribed object, and
 switch from a display of the notification for the central vision to a display of the notification for the peripheral vision.

2. The apparatus according to claim 1, wherein
in response to the prescribed object being in the range of central vision, the circuitry is configured to generate a notification where at least one of shape and color varies according to a type of the prescribed object, and
in response to the prescribed object being in the range of peripheral vision, the circuitry is configured to not generate a notification.

3. The apparatus according to claim 1, wherein
in response to the prescribed object being in the range of central vision, the circuitry is configured to generate a notification where at least one of shape and color varies according to a level of risk of the prescribed object, and
in response to the prescribed object being in the range of peripheral vision, the circuitry is configured to not generate a notification.

4. The apparatus according to claim 1, wherein in response to the foreground data being received a plurality of times, the circuitry is configured to determines the range of central vision and the range of peripheral vision using latest line-of-vision data obtained from received multiple foreground images.

5. The apparatus according to claim 1, wherein the foreground data includes at least one of image data obtained by capturing an image ahead of the vehicle in the direction of travel and data of the prescribed object detected by a detection device.

6. The apparatus according to claim 1, wherein the determining whether the recognized at least one object meets prescribed conditions includes:
 determining a position of the recognized at least one object;
 determining a relative velocity of the recognized at least one object; and
 determining whether the at least one object is dangerous based on at least one of a desired position threshold or a desired relative velocity threshold, and the determined position and the determined relative velocity.

7. A method of controlling a display, the method comprising:
 receiving foreground data including at least one object that is located ahead of a vehicle in a direction of travel;
 receiving line-of-vision data from which a line of vision of a driver of the vehicle is obtained;
 recognizing the at least one object in the foreground data;
 determining whether the recognized at least one object meets prescribed conditions;
 determining a range of central vision and a range of peripheral vision in the foreground data using the line-of-vision data;
 determining whether the prescribed object is located in the range of central vision or the range of peripheral vision of the driver;
 controlling a display of a notification corresponding to the prescribed object differently according to a result of the determining whether he prescribed object is located in the range of central vision or the range of peripheral vision; and wherein in response to the prescribed object being in the range of central vision, generating a notification for display in the central vision for the prescribed object; and in response to the prescribed object being in the range of peripheral vision for a certain length of time or longer, generating a notification for display in the peripheral vision for the prescribed object, and
 switching from a display of the notification for the central vision to a display of the notification for the peripheral vision.

8. The method according to claim 7, further comprising:
in response to the prescribed object being in the range of central vision, generating a notification where at least one of shape and color varies according to a type of the prescribed object; and
in response to the prescribed object being in the range of peripheral vision, not generating a notification.

9. The method according to claim 7, further comprising:
in response to the prescribed object being in the range of central vision, generating a notification where at least one of shape and color varies according to a level of risk of the prescribed object; and
in response to the prescribed object being in the range of peripheral vision, not generating a notification.

10. The method according to claim 7, further comprising:
in response to the foreground data being received a plurality of times, determining the range of central vision and the range of peripheral vision using latest line-of-vision data obtained from received multiple foreground images.

11. The method according to claim 7, further comprising:
capturing image data using a detection device, the captured image data including an image ahead of the vehicle in the direction of travel as the foreground data and data of the prescribed object.

12. The method according to claim 7, wherein the determining whether the recognized at least one object meets prescribed conditions includes:
 determining a position of the recognized at least one object;
 determining a relative velocity of the recognized at least one object; and
 determining whether the at least one object is dangerous based on at least one of a desired position threshold or a desired relative velocity threshold, and the determined position and the determined relative velocity.

13. A non-transitory computer-readable recording medium storing computer readable instructions, which when executed by at least one processor, causes the at least one processor to execute a method, the method comprising:
 receiving foreground data including at least one object that is located ahead of a vehicle in a direction of travel;
 receiving line-of-vision data from which a line of vision of a driver of the vehicle is obtained;
 recognizing the at least one object in the foreground data;
 determining whether the at least one object meets prescribed conditions;

determining a range of central vision and a range of peripheral vision in the foreground data using the line-of-vision data;

determining whether the prescribed object is located in the range of central vision or the range of peripheral vision of the driver;

controlling a display of a notification for the prescribed object differently according to a result of the determining whether the prescribed object is located in the range of central vision or the range of peripheral vision, and wherein in response to the prescribed object being in the range of central vision, generating a notification for display in the central vision for the prescribed object; and in response to the prescribed object being in the range of peripheral vision for a certain length of time or longer, generating a notification for display in the peripheral vision for the prescribed object, and switching from a display of the notification for the central vision to a display of the notification for the peripheral vision.

14. The non-transitory computer-readable recording medium according to claim 13, the method further comprising:

in response to the prescribed object being in the range of central vision, generating a notification where at least one of shape and color varies according to a type of the prescribed object; and in response to the prescribed object being in the range of peripheral vision, not generating a notification.

15. The non-transitory computer-readable recording medium according to claim 13, the method further comprising:

in response to the prescribed object being in the range of central vision, generating a notification where at least one of shape and color varies according to a level of risk of the prescribed object; and in response to the prescribed object being in the range of peripheral vision, not generating a notification.

16. The non-transitory computer-readable recording medium according to claim 13, the method further comprising:

in response to the foreground data being received a plurality of times, determining the range of central vision and the range of peripheral vision using latest line-of-vision data obtained from received multiple foreground images.

17. The non-transitory computer-readable recording medium according to claim 13, the method further comprising:

capturing image data using a detection device, the captured image data including an image ahead of the vehicle in the direction of travel as the foreground data and data of the prescribed object.

18. The non-transitory computer-readable recording medium according to claim 13, wherein the determining whether the recognized at least one object meets prescribed conditions includes:

determining a position of the recognized at least one object;

determining a relative velocity of the recognized at least one object; and determining whether the at least one object is dangerous based on at least one of a desired position threshold or a desired relative velocity threshold, and the determined position and the determined relative velocity.

* * * * *